United States Patent [19]

Howerin

[11] 4,341,540
[45] Jul. 27, 1982

[54] VACUUM CLEANER ACCESSORY

[76] Inventor: Charles R. Howerin, 852 NE. 20th Dr., Wilton Manors, Fla. 33305

[21] Appl. No.: 255,463

[22] Filed: Apr. 20, 1981

[51] Int. Cl.³ .......................................... B01D 45/08
[52] U.S. Cl. ...................... 55/307; 15/353; 55/274; 55/465; 55/DIG. 3
[58] Field of Search ............... 55/216, 274, 465, 462, 55/417, 423, 357, 246, DIG. 3, 307; 15/353

[56] References Cited

U.S. PATENT DOCUMENTS

| | | | |
|---|---|---|---|
| 570,790 | 11/1896 | Gaiennie | 55/423 X |
| 926,107 | 6/1909 | Gamble | 55/465 |
| 2,157,829 | 5/1939 | Metzgar | 55/465 |
| 2,467,652 | 4/1949 | Beede | 55/274 X |
| 2,822,061 | 2/1958 | Pettit et al. | |
| 2,867,231 | 1/1959 | Gerstmann | 15/353 UX |
| 3,006,020 | 10/1961 | Fillery | 55/216 X |
| 3,267,511 | 8/1966 | Meyerhoefer | 15/353 |
| 3,618,297 | 11/1971 | Hamrick | 55/216 |
| 3,926,594 | 12/1975 | Seib et al. | 55/423 X |
| 4,055,405 | 10/1977 | Thun-Hohenstein | 55/216 |
| 4,138,761 | 2/1979 | Nauta | 15/353 |
| 4,162,904 | 7/1979 | Clay et al. | 55/462 X |
| 4,226,000 | 10/1980 | Tribolet | 15/353 X |

FOREIGN PATENT DOCUMENTS

| | | | |
|---|---|---|---|
| 495509 | 6/1954 | Italy | 15/353 |
| 26781 | of 1906 | United Kingdom | 15/353 |

Primary Examiner—Kathleen J. Prunner
Attorney, Agent, or Firm—Oltman and Flynn

[57] ABSTRACT

The present accessory is connected between the pickup head and the intake of a dry vacuum cleaner to catch water drawn in through the pickup head when the vacuum cleaner is in operation. The accessory has a housing with a water collection chamber and a baffle in the way of the discharge from an intake fitting which can be connected to a hose having the vacuum pickup head at its opposite end. An outlet fitting on the housing is out of the direct path of the discharge from the intake fitting. This outlet fitting can be attached to a hose leading to the intake of the vacuum cleaner.

3 Claims, 9 Drawing Figures

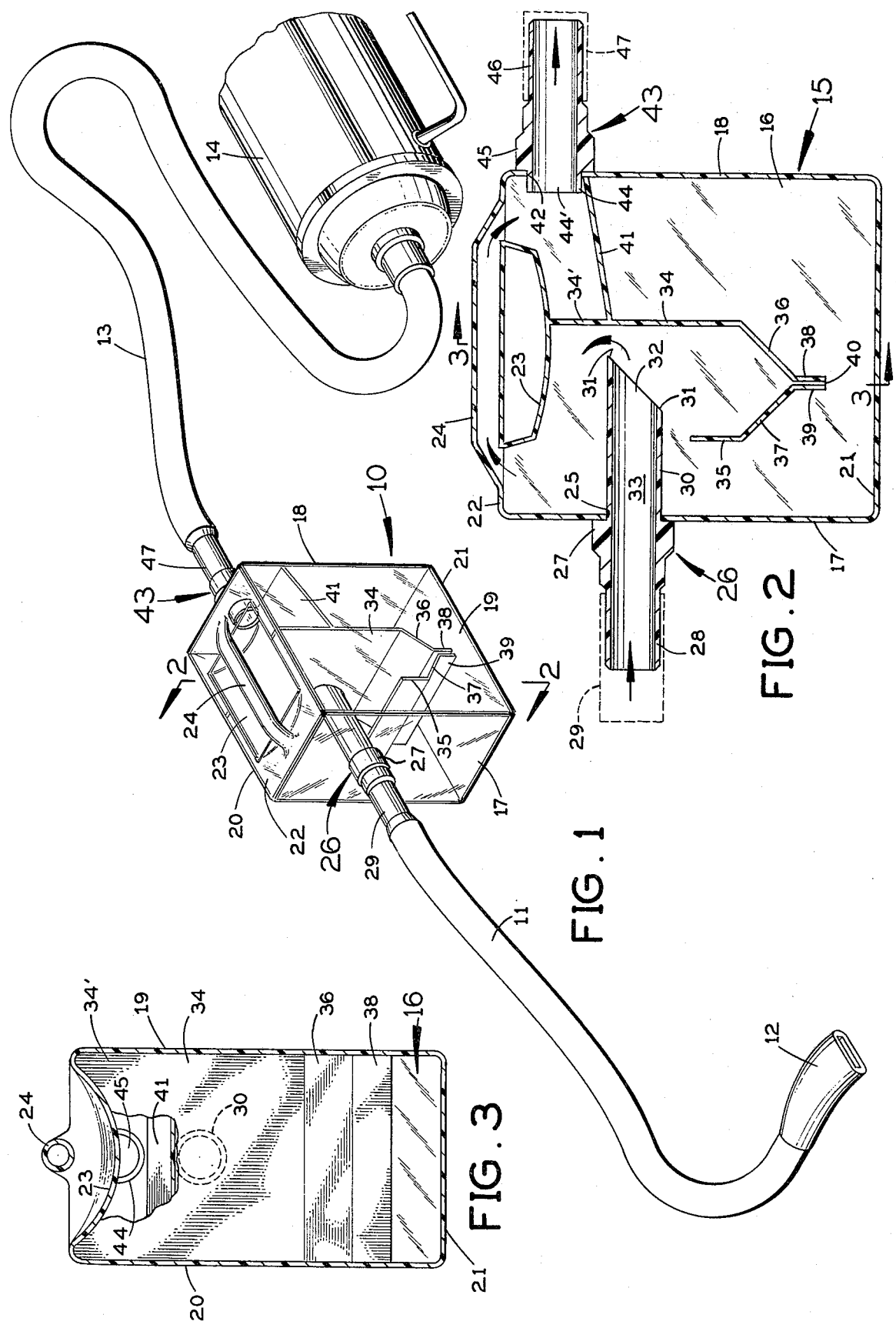

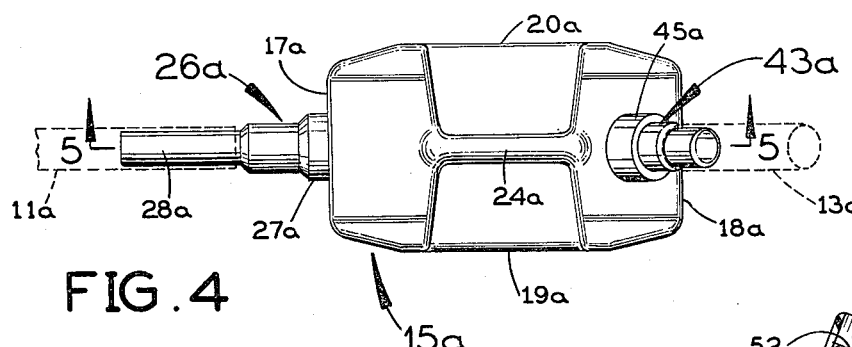
FIG. 4
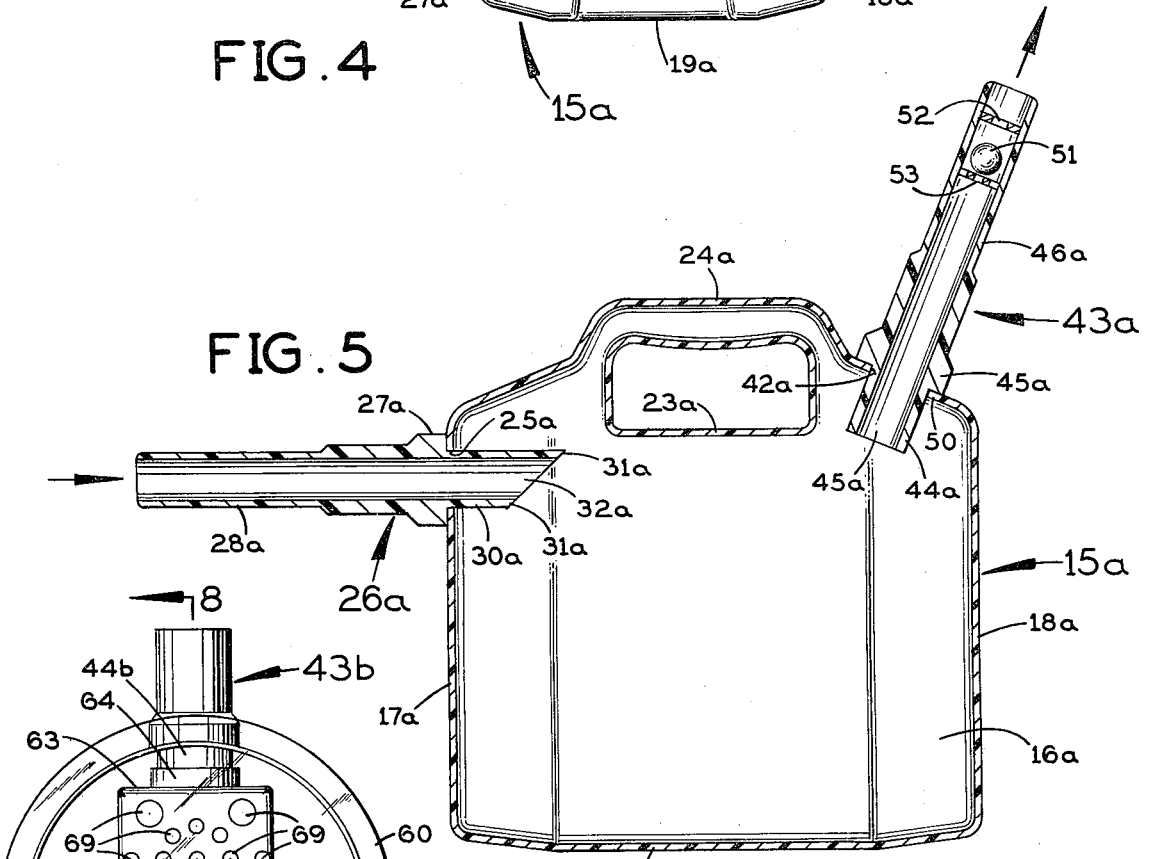
FIG. 5
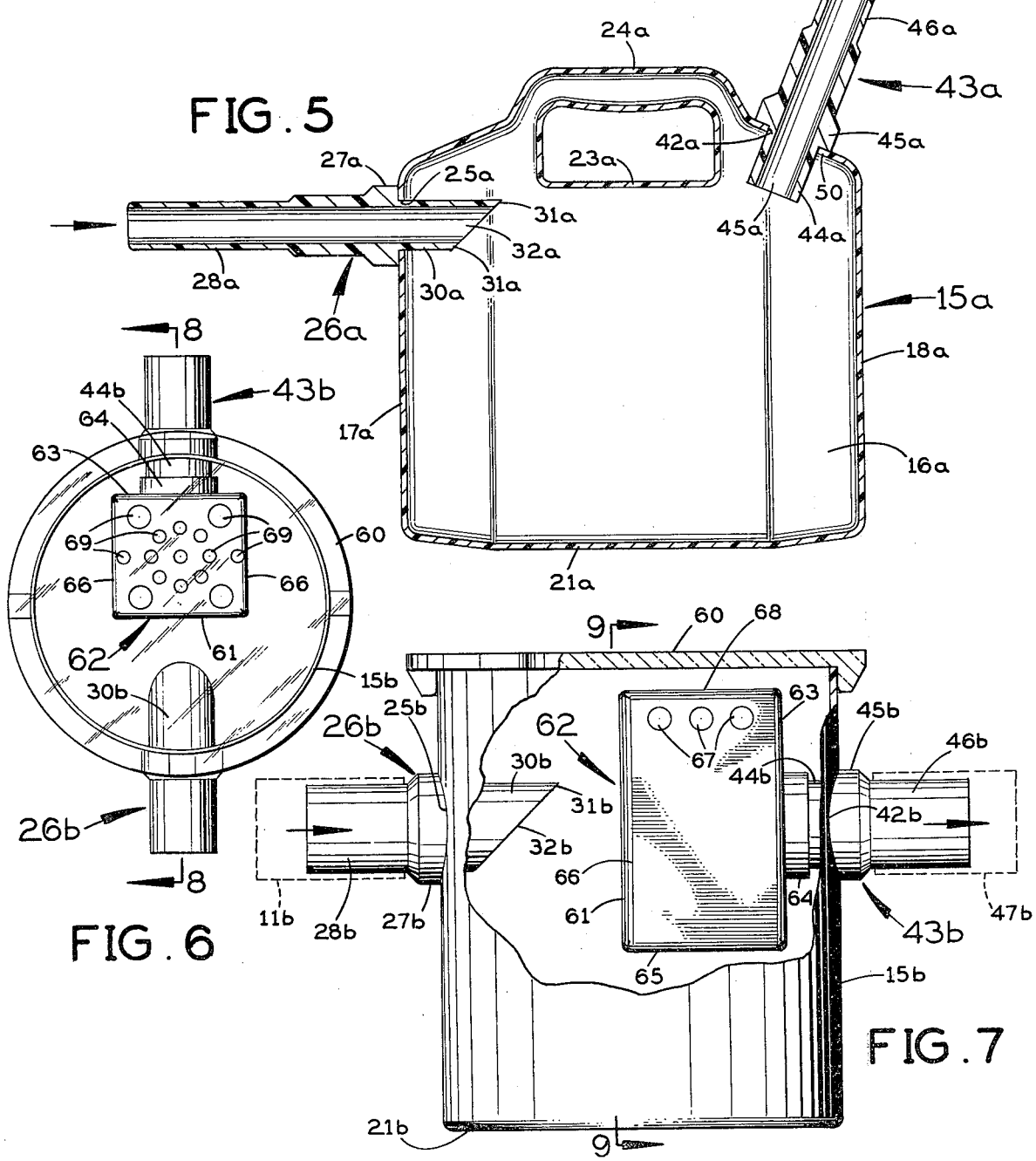
FIG. 6
FIG. 7

VACUUM CLEANER ACCESSORY

SUMMARY

This invention relates to an accessory for use with a conventional vacuum cleaner to adapt it for wet as well as dry operation.

A principal object of this invention is to provide an accessory for use with a vacuum cleaner for separating liquid, particularly water, from air drawn in from the pickup head before the water can reach the vacuum cleaner. This enables a conventional vacuum cleaner, which is not designed to pick up water or other liquids, to be used for that purpose without damaging it or impairing its effectiveness as a dry vacuum cleaner.

The present accessory is designed for connection between two flexible hoses, one of which has the pickup head on its opposite end and the other of which extends to the intake of the vacuum cleaner proper. Except for the division of the intake hose into two segments, the present accessory requires no change in a conventional vacuum cleaner system designed for dry operation. The preent accessory has a housng with a liquid collection chamber inside and open-ended, hollow intake and outlet fittings on opposite sides of the collection chamber for attachment to the hoses. Preferably, the intake fitting defines a horizontal intake passage which terminates inside the housing in a discharge opening defined by an annular inner end edge of the intake fitting which is inclined upward into the housing in the direction of flow of the air, dirt and water drawn in through the intake fitting. The inclination of this discharge opening tends to direct the heavier constituents of this intake stream down into the collection chamber. The outlet fitting defines an outlet passage which is out of the direct path of the discharge from the intake fitting. A baffle inside the housing opposite the discharge opening of the intake fitting deflects incoming water and dirt particles down into the collection chamber.

DESCRIPTION OF THE DRAWINGS

FIG. 1 is a perspective view showing a first embodiment of the present accessory connected to a conventional dry vacuum cleaner to adapt it for wet operation;

FIG. 2 is a vertical longitudinal section through this accessory, taken along the line 2—2 in FIG. 1;

FIG. 3 is a vertical cross-section taken along the line 3—3 in FIG. 2;

FIG. 4 is a top plan view of a second embodiment of the present accessory;

FIG. 5 is a vertical longitudinal section taken along the line 5—5 in FIG. 4;

FIG. 6 is a top plan view of a third embodiment of the present accessory;

FIG. 7 is a side elevation of this accessory, partly broken away for clarity;

Figure 8:
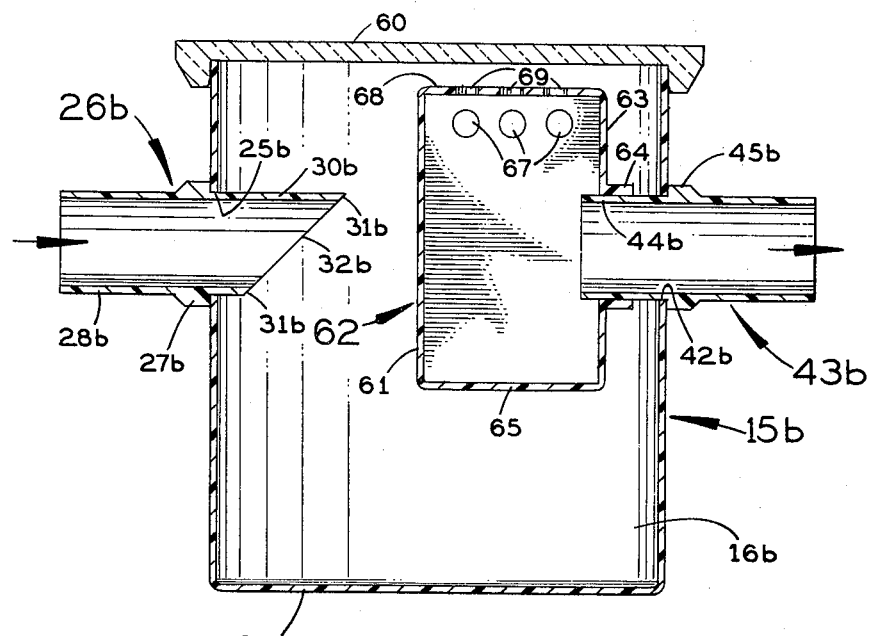
FIG. 8 is a vertical longitudinal section taken along the line 8—8 in FIG. 6.

Before explaining the disclosed embodiments of the present invention in detail, it is to be understood that the invention is not limited in its application to the details of the particular arrangements shown, since the invention is capable of other embodiments. Also, the terminology used herein is for the purpose of description and not of limitation.

DETAILED DESCRIPTION

Referring to FIG. 1, the accessory 10 is connected between a flexible hose 11 having a pickup head 12 on its opposite end and another flexible hose 13 which leads to the intake of a vacuum cleaner 14 of any suitable design which is intended for "dry" operation, that is, to pick up dirt and the like which is substantially free of water which might damage the motor or other parts of the vacuum cleaner.

Referring to FIG. 2, the accessory 10 comprises a hollow, generally rectangular housing 15 of suitable rigid, transparent plastic material which encloses a collection chamber 16. In the particular embodiment shown, the housing has flat, opposite, vertical end walls 17 and 18, flat opposite, vertical front and back walls 19 and 20, a flat, horizontal, bottom wall 21, and a top wall 22 formed with a central depression 23 below a hollow handle 24 which is raised up slightly from the top wall.

The housing end wall 17 is formed with a circular opening 25 (FIG. 2) which holds a hollow, open-ended intake fitting 26, which is sealed to the housing wall 17 in air-tight fashion. The intake fitting 26 is generally cylindrical, presenting an outwardly protruding collar 27 which abuts against the outside of the housing end wall 17 to limit the insertion of this fitting into the opening 25. At its outer end, the intake fitting terminates in a cylindrical neck 28 which fits snugly inside a collar 29 (FIG. 1) on the adjacent end of the pickup hose 11. Inside the housing, the intake fitting presents an inwardly extending cylindrical segment 30 which terminates in an annular end edge 31 which tapers upward and inward into the housing in the direction of the flow of air, dirt and water through the intake fitting. This inner end edge 31 surrounds a discharge opening 32 at the inner end of a horizontal passageway 33 extending lengthwise through the intake fitting for passing air, water, dirt particles and other debris from the pickup hose 11.

Inside the housing 15 a transparent display chamber is formed by spaced, opposite vertical walls 34 and 35, oppositely inclined bottom walls 36 and 37 which converge toward each other downward from the lower ends of the walls 34 and 35, and parallel, closely spaced lower end lips 38 and 39 which extend down from the bottom edges of the inclined bottom walls 36 and 37. Each of the walls 34, 35, 36, 37, 38 and 39 extends from the front wall 19 of the housing to the rear wall 20. The bottom edges of the lower end lips 38 and 39 are spaced substantially above the bottom wall 21 of housing 15. The lower end lips 38 and 39 are close enough to one another that the opening 40 between them acts as a flow restriction to impede the flow of water down into the collection chamber.

The vertical chamber wall 34, 34' serves as a baffle which is in spaced, confronting relationship to the inclined discharge opening 32 of the intake fitting 26. The discharge from this opening impinges against this baffle wall, and water and much of the dirt particles and the like in this discharge drop down along this baffle wall to the opening 40 leading down into the collection chamber. The inclination of the inner edge 31 of the intake fitting 26 around its discharge opening 32 tends to direct the heavier constituents of the incoming stream (i.e., water and dirt particles) down into the collection chamber.

As shown in FIG. 2, the top edge of the baffle wall 34 is substantially as high as the top of the tapered inner edge 31 of the intake fitting 26. At its top edge, the baffle wall 34 is joined to an upwardly inclined wall 41 which extends from it over to the housing end wall 18. The wall 41 extends from the front wall 19 to the rear wall 20 of the housing.

A circular opening 42 is formed in the housing end wall 18 just above the interior wall 41. This opening holds a hollow, open-ended outlet fitting 43, which is sealed to the housing wall 18 in air-tight fashion. The fitting has a cylindrical neck 44 at its inner end which projects snugly through the opening 42 and terminates in a circular opening 44' located just above the interior wall 41. Just outside the housing end wall the outlet fitting 43 presents a transversely enlarged annular collar 45 and beyond this collar it terminates in a cylindrical neck 46 which fits snugly inside a collar 47 on the end of hose 13.

In operation, when the accessory 10 is connected as shown in FIG. 1 and the vacuum cleaner 14 is turned on, when the nozzle 12 is used to clean spills which contain water or other liquid, the liquid drawn in through the intake fitting 26 impinges against the baffle 34 and drops down into the collection chamber 16 after passing through the relatively narrow opening 40. Particles of dirt and the like which are entrained in the water droplets also drop down through the opening 40 into the collection chamber 16. The narrow opening 40 impedes the downward flow enough that the user can determine whether the water is dirt-free or not by looking at it just above the opening 40.

Air which is drawn in through the intake fitting 26 also impinges on the baffle 34 but is drawn up through handle 24 and the outlet fitting 43 and hose 13 to the intake of vacuum cleaner 14.

Because the inner end of the outlet fitting 43 is located out of the direct path of the discharge from the intake fitting 26 there is very little chance for water to get into the hose 13 leading to the vacuum cleaner. Instead the water and much of the dirt and other solid matter entering the accessory 10 strike the baffle 34 and drop down into the collection chamber.

The interior wall 41 separates the collection chamber 16 from the outlet fitting 43 so that if the accessory 10 is tipped over water in the collection chamber 16 should not enter the outlet fitting 43.

FIGS. 4 and 5 show a second embodiment of the invention in which elements of the accessory which have the same functions as those of the first embodiment, shown in FIGS. 1-3, have the same reference numerals, with an "a" suffix added.

In the embodiment of FIGS. 4 and 5 the display chamber is omitted and the end wall 18a of the accessory housing 15a itself serves as the baffle against which the stream of air, water, dirt and other debris discharged from the mouth 32a of the intake fitting 26a impinges. The water droplets and much of the dirt drop down into the collection chamber 16a. The housing 15a is transparent so that the user can see the water level in the collection chamber 16a and the amount of dirt in it.

The hollow, open-ended outlet fitting 43a is mounted in an opening 42a formed in an inclined top wall 5 of the accessory housing 15a at the opposite end of the handle 24a from the intake fitting 26a. The outlet fitting extends up from the housing almost vertically. The opening 44'a at its inner end inside the housing 15a is slightly above the path of the water and solid particles which enter this housing through the intake fitting 26a.

As a further precaution against the entry of water into the vacuum cleaner (not shown) whose hose 13a (FIG. 4) is attached to the outlet fitting 43a of this accessory, a float valve is located in this outlet fitting. This float valve comprises a ball float 51 located below an apertured plate 52 and above a plate 53 formed with a plurality of openings. The ball float 51 has sufficient clearance inside the outlet fitting to permit the relatively free passage of air around it and through the central opening in the upper plate 52 to the vacuum cleaner. However, if the accessory housing 15a is tipped over and water from the collection chamber 16a rises to the ball 51, the ball will float up against plate 52 and block its opening to prevent the water from being drawn into the vacuum cleaner.

Figure 9:
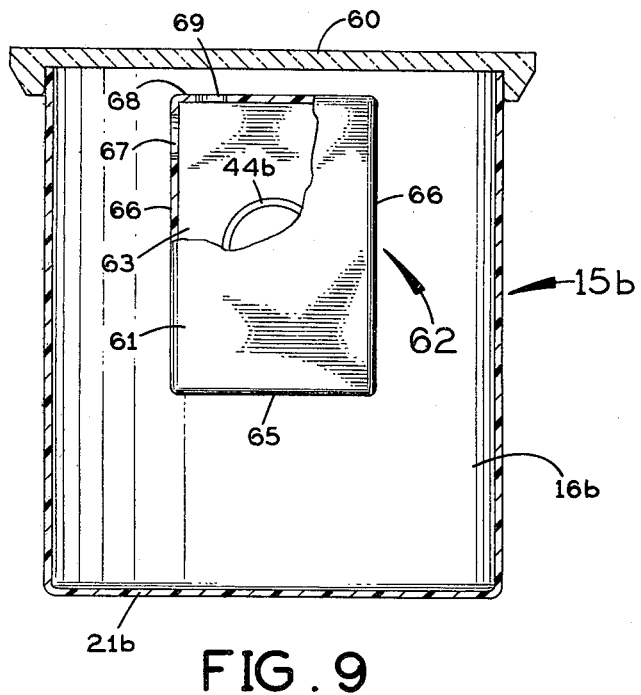
FIG. 9 is a vertical cross-section taken along the line 9-9 in FIG. 7.

FIGS 6-9 show a third embodiment of the invention in which elements of the accessory which correspond to those of the first embodiment, shown in FIGS. 1-3, are given the same reference numerals, with a "b" suffix added.

In this third embodiment, the housing 15b of the accessory has a substantially cylindrical side wall extending up from a horizontal, circular bottom wall 21b. A flat cover 60 fits over the top of this side wall in air-tight fashion. Preferably, this top cover is transparent.

Inside the housing 15b, the baffle against which the discharge from the intake fitting 26b impinges is provided by a vertical end wall 61 of a hollow receptacle 62 of rectangular cross-section. The opposite end wall 63 of this receptacle carries a cylindrical collar 64 which fits over the inner end segment 44b of the outlet fitting 43b. Receptacle 62 has an imperforate bottom wall 65, opposite side walls 66, each of which is formed with several openings 67 near the top, and a top wall 68 which is spaced a short distance below the top cover 60 on the accessory housing 15b. This top wall is formed with a multiplicity of openings 69 (FIG. 6).

In the operation of this apparatus, water and dirt particles drawn in through the intake fitting strike the baffle 61 and drop down into the collection chamber 16b in the housing 15b. Air and some of the lighter particles of dirt and other debris are drawn into the receptacle 62 through the openings 67 and 69, and from this receptacle they pass through the outlet fitting 43b to the vacuum cleaner.

The receptacle 62 shields the outlet fitting 43b from the intake fitting 26b so that the passage through the outlet fitting is out of the direct path of the discharge from the discharge opening 32b of the intake fitting 26b.

It should be noted that the float valve 51 can be used in the outlet fitting of any or all of the embodiments of the invention.

I claim:

1. In an accessory for adapting a vacuum cleaner for wet operation comprising:
   a housing defining a liquid collection chamber;
   a hollow, open-ended intake fitting extending from the outside into the housing, said intake fitting defining a generally horizontal intake passageway which terminates inside the housing in a generally horizontal discharge opening above said liquid collection chamber;
   a hollow, open-ended outlet fitting extending from inside said housing above said liquid collection chamber to the outside;
   a hollow receptacle attached to said outlet fitting inside said housing and providing a baffle in spaced confronting relationship to said discharge opening of the intake fitting for deflecting water and dirt discharged through said discharge opening down into the collection chamber and blocking said outlet fitting from said discharge opening of the intake fitting, said receptacle having its hollow interior in fluid communication with said outlet fitting and having a top with openings formed therein positioned higher than said discharge opening of the intake fitting for passing air from the inside of the housing to said outlet fitting,
the improvement wherein said receptacle has sides with openings formed therein near the top of the receptacle positioned higher than said discharge opening of the intake fitting for passing air from the inside of the housing to said outlet fitting.

2. An accessory according to claim 1, wherein said intake fitting terminates inside the housing in an annular edge surrounding said discharge opening which tapers upward and inward into the housing in the direction of the flow through the intake fitting.

3. An accessory according to claim 1, wherein said receptacle is imperforate below said openings in its sides except at said outlet fitting.

* * * * *